United States Patent [19]

Anthony et al.

[11] 4,309,251

[45] Jan. 5, 1982

[54] NUCLEAR FUEL ASSEMBLY HOLDDOWN APPARATUS

[75] Inventors: Andrew J. Anthony, Tariffville; Kenneth A. Martin, Windsor, both of Conn.

[73] Assignee: Combustion Engineering, Inc., Windsor, Conn.

[21] Appl. No.: 90,833

[22] Filed: Nov. 1, 1979

Related U.S. Application Data

[63] Continuation-in-part of Ser. No. 959,971, Nov. 13, 1978.

[51] Int. Cl.³ .............................................. G21C 3/30
[52] U.S. Cl. .................................... 376/446; 376/364
[58] Field of Search ................... 176/76, 78, 50, 61, 176/87

[56] References Cited

U.S. PATENT DOCUMENTS 4,134,790  1/1979  Bevilaqua .............................. 176/50

Primary Examiner—Donald P. Walsh
Attorney, Agent, or Firm—L. James Ristas

[57] ABSTRACT

A fuel assembly having a lower end fitting and a spidered actuating rod interacting therewith for holding the assembly down on the core support stand against the upward flow of coolant. Locking means and bracing means for interacting with projections on the support stand are carried by the lower end fitting and are actuated by the movement of the actuating rod operated from above the top of the assembly. The locking means include weak springs mounted near some but not all of the end fitting posts, for engaging the support stand. Stiff springs are mounted internal to the other posts, for uring the posts against adjacent support stand projections to provide a bracing for the locking means as the spider portion of the actuating rod presses against the locking spring. The angle and spring rate per unit length of the bracing spring are preset to assure a fairly constant locking force during the life of the assembly.

11 Claims, 14 Drawing Figures

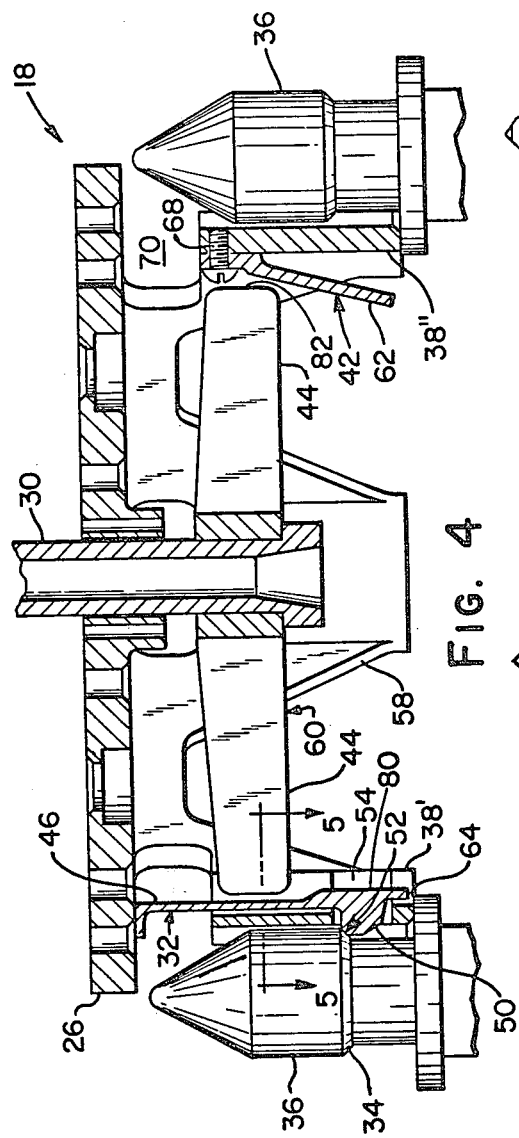
FIG. 4
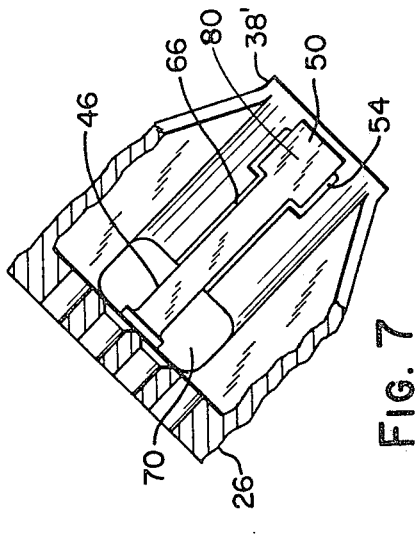
FIG. 7
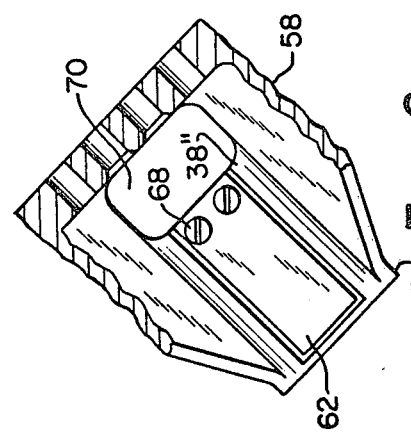
FIG. 6
FIG. 5

NUCLEAR FUEL ASSEMBLY HOLDDOWN APPARATUS

REFERENCE TO RELATED APPLICATION

This application is a continuation-in-part of co-pending application Ser. No. 959,971 filed Nov. 13, 1978.

BACKGROUND OF THE INVENTION

The present invention relates to nuclear reactor fuel assemblies, and in particular to apparatus for holding a fuel assembly down against a core support stand.

It is known that the coolant flow rate in modern nuclear reactors can be so large that the weight of the fuel assembly is insufficient to prevent the assembly from being lifted off the core support stand. One solution is to place coil springs at the top of the assembly and use the fuel upper alignment plate to compress the springs and bias the assembly down against the support stand. Although this arrangement is effective in holding down the assembly, the downward biasing force places a compressive load on the fuel assembly skeleton, i.e., the control rod guide tubes, and is believed to contribute to bowing of the fuel assembly. Assembly bowing can lead to undesirable consequences which prudent designers wish to avoid.

Another prior art arrangement locates the holddown mechanism in the assembly lower end fitting. In one such arrangement the lower end fitting has four alignment posts adapted to be located adjacent to four respective alignment pins projecting from the core support stand. Springs connected to the end fitting extend through two proximate posts and are adapted to engage shoulders on the projections. The spring locking surface is oriented to provide vertical holddown of the assembly and to provide horizontal bracing to preclude lateral vibration. The weight of the assembly provides the locking force but large external lifting forces are required to overcome the locking forces in order for the assembly to be removed from the stand. This prior art arrangement was deficient in one major respect. The spring force required to provide sufficient holddown and horizontal bracing was so large that it caused premature deterioration on the shoulders of the support stand projection during fuel assembly disengagement operations. It is preferable that, if one of the locking members is to wear, it should be the member connected to the fuel assembly, since the assembly life is typically 3 or 4 years, whereas the lifetime of the support stand projection is expected to be over 40 years.

SUMMARY OF THE INVENTION

It is an object of the invention to provide a fuel assembly having a simple apparatus for locking the assembly down onto a core support stand such that the locking can be selectively controlled from the upper end of the assembly.

It is another object to effect the locking and unlocking without producing excessive wear on any of the support stand structure.

It is a further object to provide such locking means as can be remotely unlocked in the event of failure of a locking component.

It is yet another object to provide a bottom mounted locking apparatus which maintains a fairly constant locking force throughout the entire life of the fuel assembly, and which accommodates material thermal expansion differences and the irradiation induced growth and creep of the locking and actuating components.

According to the invention, the assembly has a lower end fitting resting on the support stand, actuating means extending from the upper end of the fuel assembly through the lower end fitting and having spidered extensions, and locking and bracing means responsive to the movement of the actuating means for selectively interacting with the projections. The actuating means comprises a rod disposed along the vertical axis of the fuel assembly and extending into the lower end fitting, where laterally extending actuating arms are attached to the rod. The lower end fitting forms alignment posts to be located adjacent alignment pins in the support stand. Two of the posts are fitted with locking springs which are adapted to engage shoulder means in the pins. The other posts are fitted with bracing springs that do not engage the adjacent pins. During placement of the assembly onto the stand, the actuating rod is in an upmost position so that the arms are above the locking and bracing springs. To lock the assembly into place, the rod is forced downward whereby the arms contact the surfaces of the springs. It is contemplated that the core upper alignment plate will provide this holddown force. The locking springs, having a low spring constant, are forced outward into engagement with the adjacent pin shoulder. The bracing springs, having a high spring constant, produce horizontal movement of the posts into firm contact against the adjacent pins. The combined effect is that one set of springs provides positive locking holddown and the other set provides lateral bracing against vibration.

The bracing springs are preferably rectangular or trapezoidal and are mounted inside their respective posts at an angle chosen to provide at least a minimum horizontal loading force throughout the expected growth range of the actuating rod. The angle accounts for maximum tolerance variation and avoids overstressing the spring material.

BRIEF DESCRIPTION OF THE DRAWINGS

Other objects and advantages of the invention will be evident from the description accompanying the drawings in which:

FIG. 4 is a section view along the lines 4—4 of FIG. 2.

FIG. 5 is a section view of a post having the locking spring, taken along the lines 5—5 of FIG. 4.

FIG. 6 is a detailed elevation view of the internal side of a post having the bracing spring, taken along the lines 6—6 of FIG. 2.

FIG. 7 is a detailed elevation view of the internal side of a post having the locking spring, taken along the lines 7—7 of FIG. 2.

DESCRIPTION OF THE PREFERRED EMBODIMENT

Figure 1:
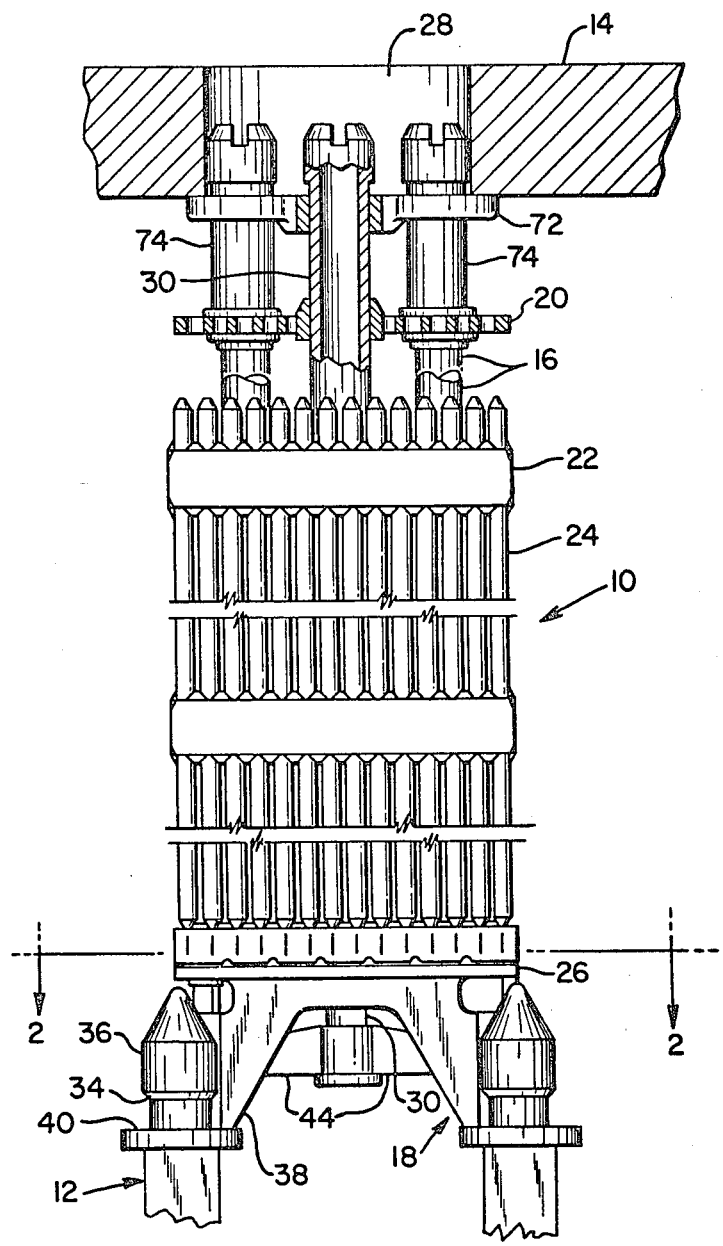
FIG. 1 is an elevation view of a nuclear fuel assembly showing the preferred embodiment of the invention.

FIG. 1 shows a nuclear fuel assembly 10 located on a core support stand 12 and aligned at the top in the core upper alignment plate 14. The skeleton of the fuel assembly includes a plurality of control rod guide tubes 16 fixedly connected to the lower end fitting 18 and the perforated upper end plate 20. Spacer grids 22 are welded to the guide tubes 16 and provide a support matrix for retaining a plurality of fuel rods 24. During operation of the reactor, a coolant is pumped upward from below the support stand 12, up through perforations in the lower end plate 26, over the fuel rods 24, through the upper end plate 20 and out the upper alignment plate 14 through opening 28. The present invention provides an apparatus for holding the fuel assembly 10 down against the core support stand 12 to prevent the upward flow of the coolant from lifting the assembly off the stand. In the preferred embodiment of the invention, the fuel assembly 10 includes an actuating rod 30 movable with respect to the upper end plate 20 and the lower end fitting 18. The actuating rod 30 operates locking means 32 (FIG. 2) carried by the lower end fitting 18 whereby the assembly is locked to the shoulders 34 on the fuel alignment pins 36 formed as projections on the core support stand 12.

Figure 2:
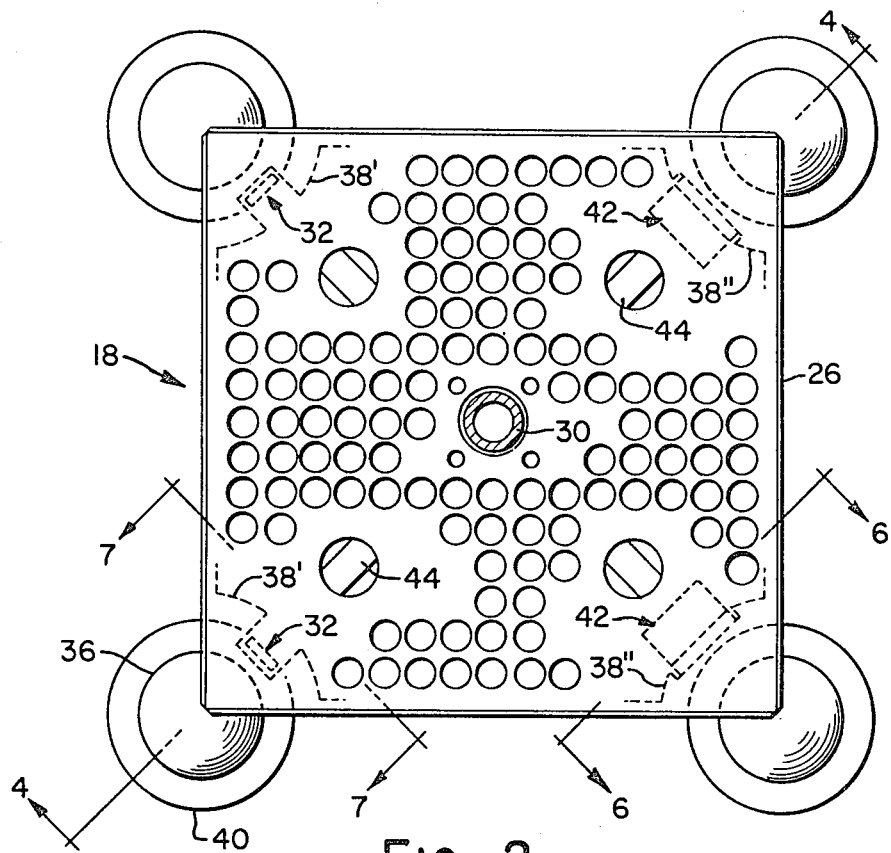
FIG. 2 is a section view along the lines 2—2 of FIG. 1, with the control rod guide tubes omitted.

FIG. 2 shows the upper surface of the lower end plate 26 and FIGS. 1 and 2 show the relation of the lower end fitting 18 to the alignment pins 36. The posts 38 of the lower end fitting 18 rest on the base portion 40 of the pins 36. The locking means 32, shown in phantom in FIG. 2, are associated with the two posts 38' in the left side of FIG. 2, and the bracing means 42 are associated with the right most posts 38" in FIG. 2. The locking means 32 and bracing means 42 are activated by actuating arms 44, which are operated by actuating rod 30 disposed in the center of the end fitting 18 and movable with respect thereto.

Figure 3:
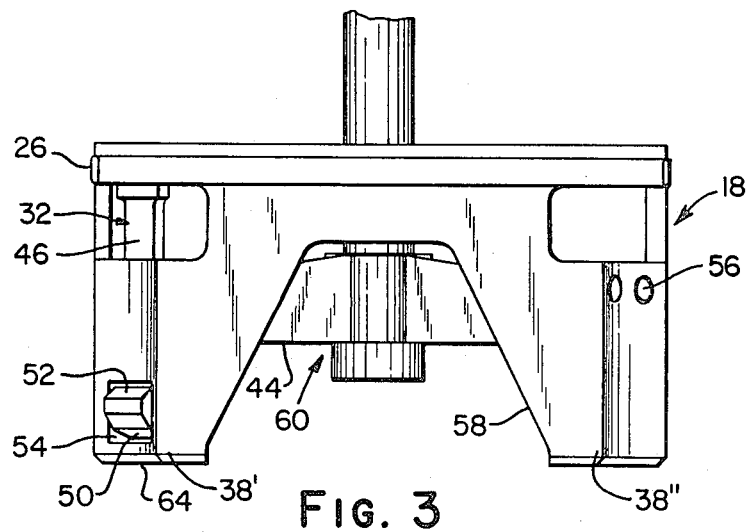
FIG. 3 is an enlarged view of the lower end fitting shown in FIG. 1 with the support stand alignment pins removed to show details of the post.

As shown in FIGS. 3 and 4, the locking means 32 includes a cantilever spring 46 welded to the lower end plate 26 and having a shank portion extending downward behind the post 38'. The latch portion 50 of the locking spring 46 has an external side formed into a cam 52 which is laterally movable through the opening 54 in the post 38'. The other post 38" includes taps 56 (FIG. 3) thereon for use in connecting the bracing means 42 to the inside of the post. The four posts 38', 38" are extensions of a frame 58 fixedly connected to the lower end plate 26 and forming the lower portion of the end fitting 18.

Referring more specifically to FIG. 4, the locking action of the invention is more clearly shown. The actuating assembly 60 includes the actuating rod 30 and a plurality of actuating arms 44 extending laterally therefrom below the lower end plate 26. When in the upmost position the actuating assembly 60 does not provide any locking force on the locking spring 46 and the bracing spring 62. As actuating assembly 60 is forced downward, the exterior ends of the arms contact the locking springs 46 and the bracing springs 62 whereby a continued downward force causes the latch 50 to move outward into engagement with the shoulder 34 on the alignment pin 36. The angled bracing spring 62 is designed to have a much higher stiffness than the locking spring 46 so that the bracing spring 62 is deflected only slightly. However, the downward force on the bracing spring has a horizontal component which forces the lower end fitting 18 and the entire fuel assembly to move slightly to the right relative to the actuating rod 30 until the exterior surface of the post 38" firmly contacts the adjacent alignment pin 36. At a predetermined elevation of the arms 44 relative to the post sole 64, the cam 52 is firmly locked to the shoulder 34 and the lower end fitting 18 is in firm contact with the alignment pins 36.

Thus, the holddown against the coolant lift force is provided by two latches 50, and the resistance to horizontal unlocking of the latches and vibration of the assembly is provided by the action of the two bracing springs 62. In a typical modern nuclear reactor, it has been found that for a fuel assembly weighing about 1500 pounds (dry), a suitable latch spring 46 can be made from stainless steel about 100 mils in thickness or Inconel 625 about 60 mils in thickness so that the spring stiffness at the cam of the latch is preferably at least 30 pounds per inch. A suitable bracing spring 62 is made from one or two leaves of Inconel 718, each having a thickness of about 0.130 inches and a spring rate at the point of initial arm contact of about 2500 pounds per inch. The bracing spring 62 should generally be at least fifty times as stiff as the latch spring.

FIG. 5 shows in detail the relationship of the locking spring 46 to the post 38'. The external side of the latch 50 protrudes through the opening 54 in the lower portion of the post 38', and the internal side of the spring 46 extends upward within a notch 66 formed on the internal side of the post 38' (FIG. 7). The notch 66 is preferably long enough to capture the actuating arm 44 so that the arm is always in proper position for actuating the latch 50. As the arm 44 is moved downward transversely relative to the plane of the figure, an outward force is applied to the latch 50.

Details of the inner portion of the post 38" having the bracing spring 62 are shown in FIG. 6. Two taps 56 (see FIG. 3) are located in the corner of the post 38" for engaging the mounting bolts 68. The post 38" is rigidly connected to the frame 58, the area above the post remaining open to form an aperture 70 through which access can be had to structures interior to the end fitting. In FIG. 7, the locking spring 46 is shown depending from the end plate 26. The locking post 38' has an opening 54 in the lower portion through which the latch 50 is movable, and an aperture 70 above the post for permitting access to the interior of the end fitting to disengage the latch 50 in the event of component failure. A notch 66 is formed along the interior of the post 38' for capturing and guiding the vertical motion of the actuating arm 44' (not shown).

Referring again to FIGS. 1 and 4, the upper end of the actuating rod 30 is fixedly connected to the holddown plate 72. The guide tube extensions 74 are fixedly connected to the upper ends of the guide tubes 16. The holddown plate 72 is movable relative to the extensions 74. During reactor refueling, the upper alignment plate 14 is removed from the reactor core so that a relatively small upward force on the actuating rod 30 will cause the actuating arms 44 to rise above and out of contact with the springs 46, 62. Thus the fuel assembly is unlocked and may be removed from the core support stand 12 without high frictional forces being exerted on the shoulders 34 of the alignment pins 36. After a new or relocated assembly 10 is placed on the core support stand 12 and properly oriented on the base 40 of alignment pins 36, the upper alignment plate 14 is placed over all assemblies simultaneously and clamped down by the reactor vessel closure head (not shown). As the upper alignment plate 14 is clamped down, it exerts a downward force on each holddown plate 72 whereby the actuating rods 30 on all assemblies are forced downward to effectuate the locking and bracing action at the lower end fitting 18.

Once locked in place, a fuel assembly must remain locked for at least one year of continuous reactor operation, until the next refueling. Furthermore, some assemblies may not be removed during refueling, so that they must remain effectively locked for two years of operation. Also, some assemblies may be in the core for four or more fuel cycles.

It can be appreciated that, due to the high cummulative exposure to radiation, the fuel assembly and assembly holddown components experience significant growth. Such growth changes the points of contact between the arms 44 and the latch spring 46 and bracing spring 62. It is necessary, however, that the horizontal component of force on the latching spring 46 be maintained above a minimum value, to assure that the upward flow forces do not unlock the assembly. The horizontal force component cannot be so large, however, to prevent the disengagement of the arms when the upper core alignment plate is removed for refueling.

The invention assures a proper horizontal force component throughout assembly life by providing a vertical land surface 80 on the latch 50 which mates flush with the vertical portion 82 on the arm 44. As the locked fuel assembly experiences increasing radiation exposure, the area of contact between the land surface 80 and the vertical portion 82 of the arm 44 moves lower down the latch 50. The vertical extent of the land surface 80 is large enough to accommodate the variation in arm elevation due to the differential thermal expansion and radiation induced growth. Similarly, the point of contact between the arm 44 and the bracing spring 62 moves progressively lower. The horizontal component of force is maintained within an acceptable range by preselecting the angle of attachment and the spring rate as a function of distance from the point of attachment (68).

Figure 8:
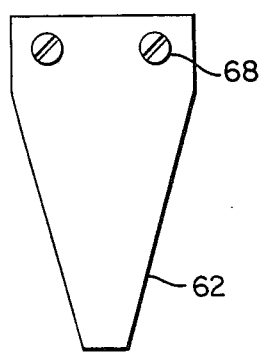
FIG. 8 is a view corresponding to that of FIG. 6, showing an alternate embodiment in which the bracing spring has a trapezoidal shape.
Figure 9:
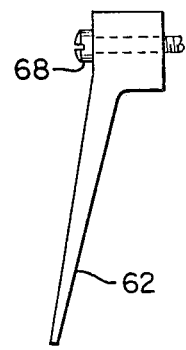
FIG. 9 is a side view of another embodiment of the bracing spring, showing a tapered thickness.
Figure 10:
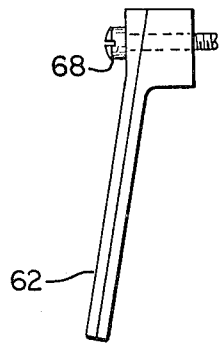
FIG. 10 is a side view of another embodiment of the bracing spring, showing stacked rectangular springs.

The bracing spring 62 shown in FIGS. 4 and 6 is rectangular and of uniform thickness. In the preferred embodiment shown in FIG. 8 the bracing spring is a trapezoid of uniform thickness. Another embodiment, shown in FIG. 9, is a rectangle of tapered thickness, and FIG. 10 shows two stacked rectangles each having a uniform thickness. Thus, the tapering or other modification of the spring shape provides for a decreasing spring rate as the point of contact with the arm 44 moves vertically lower. The spring rate decreases but the spring displacement increases as the contact point moves lower, so that the product of the spring rate and spring displacement remains approximately equal.

Figure 11A:
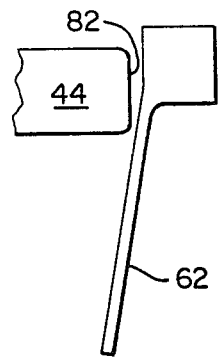
FIG. 11a is a side view of the actuating arm and bracing spring before locking has been effected.
Figure 11B:
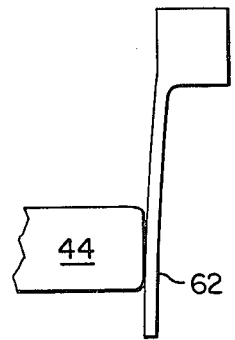
FIG. 11b is a view corresponding to that in FIG. 11a showing the relationship of the arm and bracing spring in the cold condition when the assembly is locked immediately after initial installation.
Figure 11C:
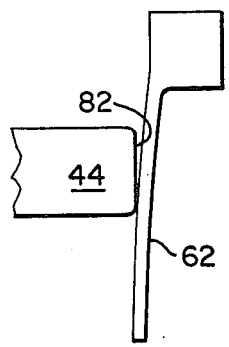
FIG. 11c is a view corresponding to FIG. 11b after initial startup, in the hot operating condition, as thermal expansion differences between the reactor internals and fuel assembly have occurred.
Figure 11D:
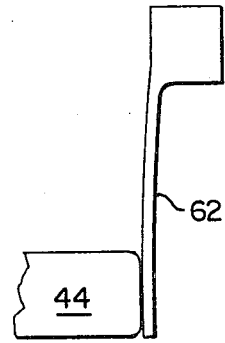
FIG. 11d is a view corresponding to FIG. 11c after the actuating rod has experienced significant radiation-induced growth.

FIGS. 11a, b, c and d show schematically the interaction between the arm 44 and the bracing spring 62 during different modes of operation. In FIG. 11a, as in FIG. 4, the assembly has not yet been locked. The bracing spring angle is about 10° to the vertical. In FIG. 11b the assembly is locked in the cold condition at the beginning of its first cycle in the reactor. In FIG. 11c the assembly is locked during operation early in its life where thermal expansion difference between reactor internals and the fuel assembly have allowed the actuating rod to move upward relative to the bracing spring 62. In FIG. 11d the assembly is locked during operation later in its life, after the actuating rod 30 has experienced radiation growth.

We claim:

1. A nuclear fuel assembly to be located below a core upper alignment plate and on a core support stand, the stand having a square array of projections thereon forming mating surfaces, comprising:
   a. a lower end fitting having an upper portion with an opening therethrough and a lower portion facing the support stand and including a square array of posts for placement adjacent to a respective array of projections;
   b. actuating means extending from the upper end of the assembly through the opening in the lower end fitting and being movable relative thereto, the actuating means including,
      (1) an actuating rod vertically movable in response to the position of the core upper alignment plate,
      (2) rigid arms fixedly connected to the lower end of the actuating rod, each arm extending toward one of the posts, the arms having a lowermost position when the core upper alignment plate is in place;
   c. locking means carried by the lower end fitting adjacent to each of a first set of two proximate posts, the external side of each latching means having a latch adapted to mate with the mating surface on the projections and having an internal side including a vertical land surface directly below the outer end of one of a first set of arms; and
   d. bracing spring means carried by each of the other two proximate posts, each bracing means being located below the outer end of one of the second set of arms, and each bracing means having an orientation and spring rate such that when each of the second set of arms is in the lowermost position it biases the bracing spring to
      (1) urge the proximate post into bracing abutment with the adjacent projection, and
      (2) produce a substantially constant horizontal locking force component that is transmitted through the arms whereby one of the latches is urged into locking engagement with the mating surface on the proximate projection.

2. The assembly of claim 1 wherein the spring rate of the bracing means depends on the elevation of the contact between the arm and the bracing spring.

3. The assembly of claim 2 wherein the vertical extent of the land surface is large enough to maintain sufficient contact with the arm throughout the variation in arm elevation due to thermal expansion and radiation induced growth of the core components, whereby the constant locking force is effected.

4. The assembly of claim 3 wherein the horizontal stiffness of the latch is weaker than the horizontal stiffness of the bracing spring means in response to contact by the arms.

5. The assembly of claim 4 wherein the bracing means is stiffer than the latch by a factor of at least fifty.

6. The assembly of claims 1 or 5 wherein the bracing spring means comprises a leaf spring cantilevered from the internal side of the post.

7. The assembly of claim 6 wherein the bracing spring means comprises a leaf spring oriented obliquely downward.

8. The assembly of claim 7 wherein the bracing spring has a trapezoidal shape.

9. The assembly of claim 7 wherein the bracing spring has a tapered thickness.

10. The assembly of claim 4 wherein the bracing means includes a spring cantilevered from the internal side of the post.

11. The assembly of claim 10 wherein the bracing spring is a leaf spring oriented obliquely downward.

* * * * *